(12) United States Patent
Lee et al.

(10) Patent No.: US 11,309,565 B2
(45) Date of Patent: Apr. 19, 2022

(54) ELECTRODE STRUCTURE AND REDOX FLOW BATTERY COMPRISING SAME

(71) Applicant: LG CHEM, LTD., Seoul (KR)

(72) Inventors: Jeongbae Lee, Daejeon (KR); Tae Geun Noh, Daejeon (KR); Sujin Byun, Daejeon (KR); Joon Ho Park, Daejeon (KR); Sikwon Moon, Daejeon (KR); Sungyeon Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 399 days.

(21) Appl. No.: 16/348,363

(22) PCT Filed: Feb. 26, 2018

(86) PCT No.: PCT/KR2018/002335
§ 371 (c)(1),
(2) Date: May 8, 2019

(87) PCT Pub. No.: WO2018/159969
PCT Pub. Date: Sep. 7, 2018

(65) Prior Publication Data
US 2019/0260054 A1     Aug. 22, 2019

(30) Foreign Application Priority Data

Feb. 28, 2017 (KR) .................. 10-2017-0026394

(51) Int. Cl.
*H01M 8/18* (2006.01)
*H01M 4/86* (2006.01)
(Continued)

(52) U.S. Cl.
CPC ............ *H01M 8/18* (2013.01); *H01M 4/86* (2013.01); *H01M 4/8631* (2013.01);
(Continued)

(58) Field of Classification Search
CPC ........ H01M 8/18; H01M 4/86; H01M 4/8631; H01M 8/0247; H01M 8/0245; H01M 8/0271; H01M 8/20
See application file for complete search history.

(56) References Cited

U.S. PATENT DOCUMENTS 6,509,119 B1    1/2003  Kobayashi et al.
7,510,626 B2 *  3/2009  Hamada ............. H01M 8/0245
                                                        162/138

(Continued)

FOREIGN PATENT DOCUMENTS

CN    102738473 A    10/2012
CN    102867978 A    1/2013
(Continued)

OTHER PUBLICATIONS

Bourell et al., Graphite-based indirect laser sintered fuel cell bipolar plates containing carbon fiber additions, Elsevier, CIRP Annals vol. 60, Issue 1, 2011, pp. 275-278 (Year: 2011).*
(Continued)

*Primary Examiner* — Helen Oi K Conley
(74) *Attorney, Agent, or Firm* — Birch, Stewart, Kolasch & Birch, LLP

(57) ABSTRACT

A redox flow battery including an electrode assembly, the electrode assembly including a carbon block having pores and a flow frame having a first and a second surface, wherein the carbon block is accommodated on one or both of the first and second surfaces.

15 Claims, 5 Drawing Sheets

(51) Int. Cl.
*H01M 8/0245* (2016.01)
*H01M 8/0247* (2016.01)
*H01M 8/0271* (2016.01)
*H01M 8/20* (2006.01)

(52) U.S. Cl.
CPC ....... *H01M 8/0245* (2013.01); *H01M 8/0247* (2013.01); *H01M 8/0271* (2013.01); *H01M 8/20* (2013.01); *Y02E 60/50* (2013.01)

(56) References Cited

U.S. PATENT DOCUMENTS

| | | | |
|---|---|---|---|
| 8,999,599 B2 * | 4/2015 | Shintani | H01M 4/88 |
| | | | 429/481 |
| 10,049,824 B2 | 8/2018 | Tsukada et al. | |
| 10,109,870 B2 | 10/2018 | Iino et al. | |
| 10,236,514 B2 | 3/2019 | Chen et al. | |
| 2014/0302423 A1 | 10/2014 | Darling et al. | |

FOREIGN PATENT DOCUMENTS

| | | |
|---|---|---|
| CN | 103633330 A | 3/2014 |
| CN | 104795583 A | 7/2015 |
| EP | 2866282 A1 | 4/2015 |
| EP | 3 024 074 A | 5/2016 |
| JP | 2000-357520 A | 12/2000 |
| JP | 2015-122229 A | 7/2015 |
| JP | 2016-85900 A | 5/2016 |
| JP | 6047799 B2 | 12/2016 |
| JP | 2017-10809 A | 1/2017 |
| KR | 10-2006-0081474 A | 7/2006 |
| KR | 10-1431070 B1 | 8/2014 |
| KR | 10-2015-0040638 A | 4/2015 |
| KR | 10-2015-0125710 A | 11/2015 |
| KR | 10-1661570 B1 | 10/2016 |
| KR | 10-2016-0128919 A | 11/2016 |
| KR | 10-170570 B1 | 2/2017 |
| KR | 10-1719887 B1 | 3/2017 |

OTHER PUBLICATIONS

International Search Report (PCT/ISA/210) issued in PCT/KR2018/002335, dated Jun. 8, 2018.

Extended European Search Report for European Application No. 18761044.9, dated Oct. 18, 2019.

* cited by examiner

[FIG. 1]
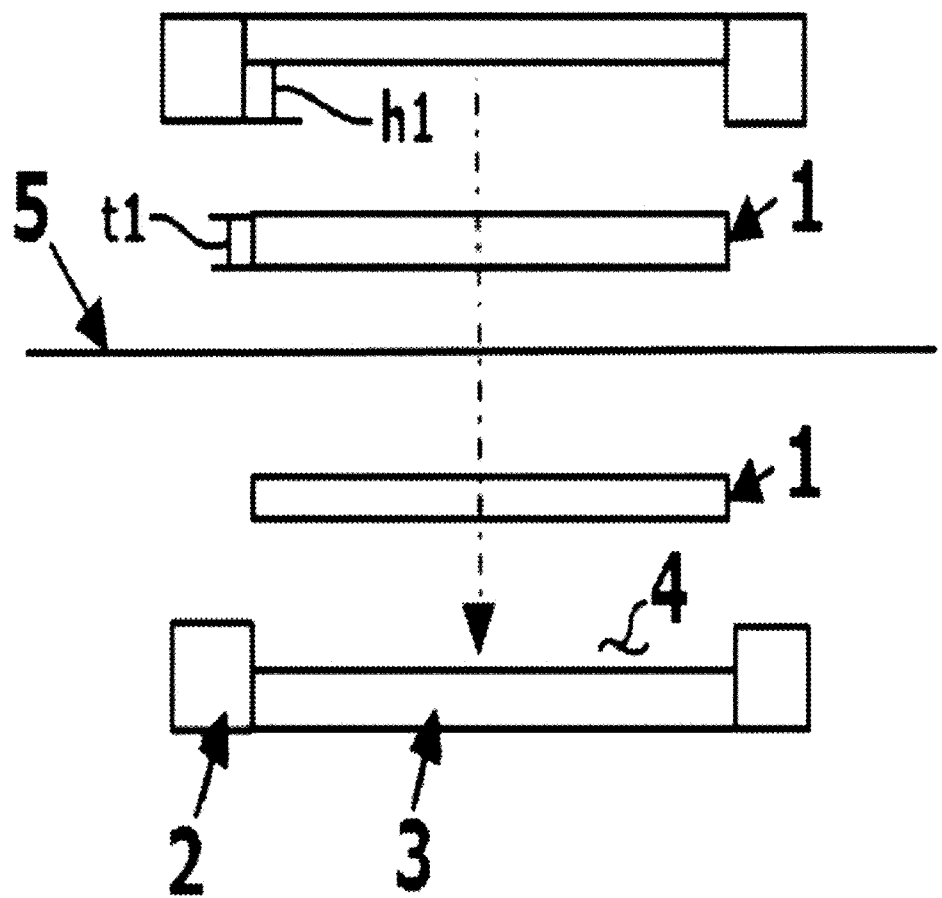
[FIG. 2]
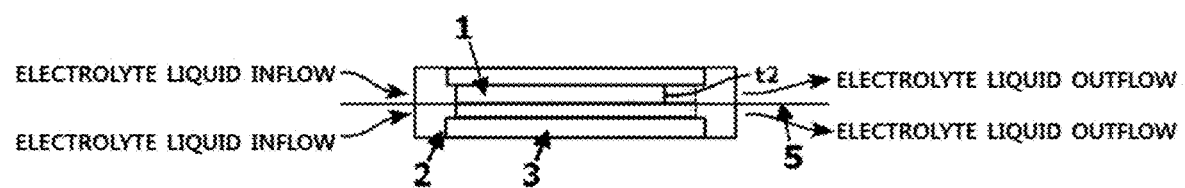

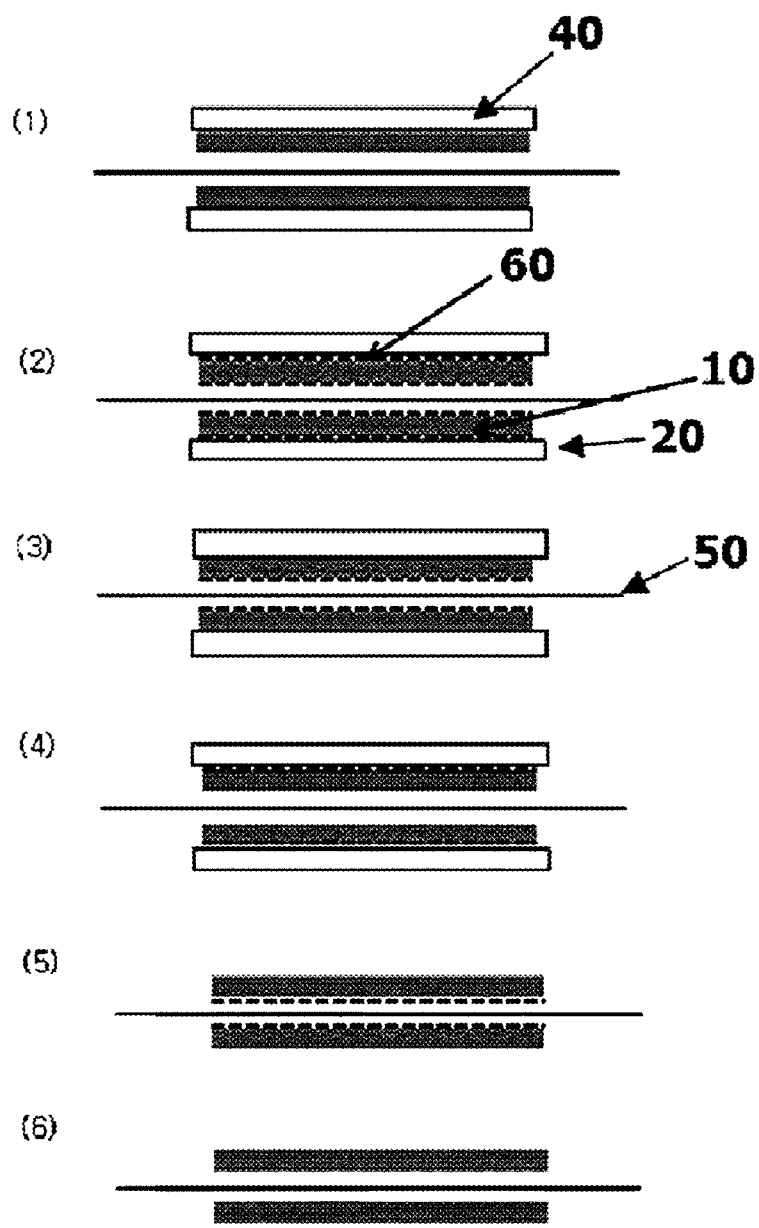
[FIG. 3]

[FIG. 4]
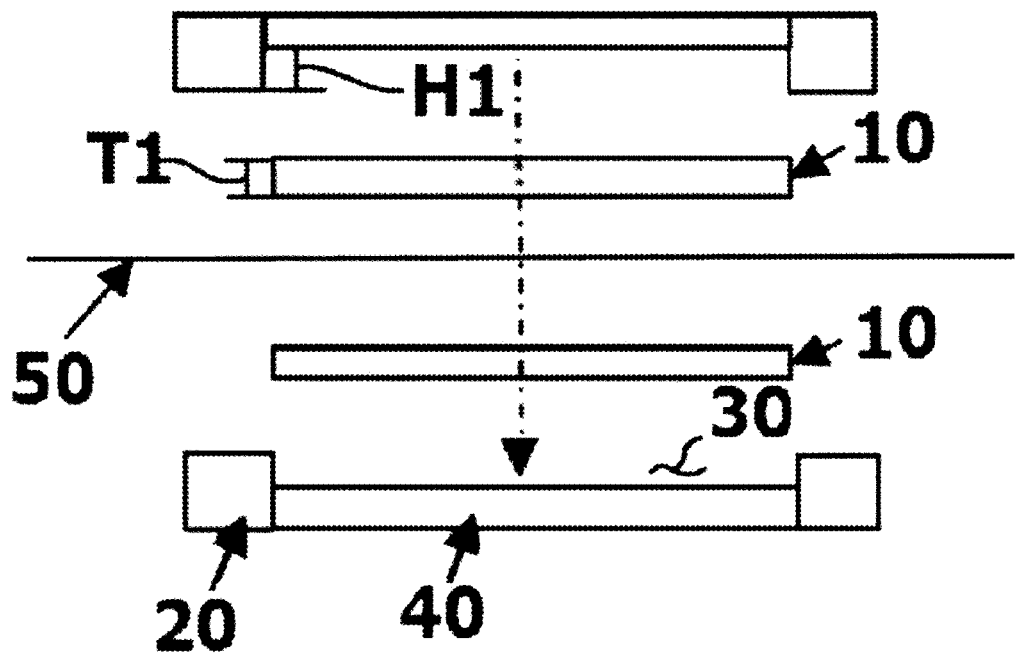
[FIG. 5]
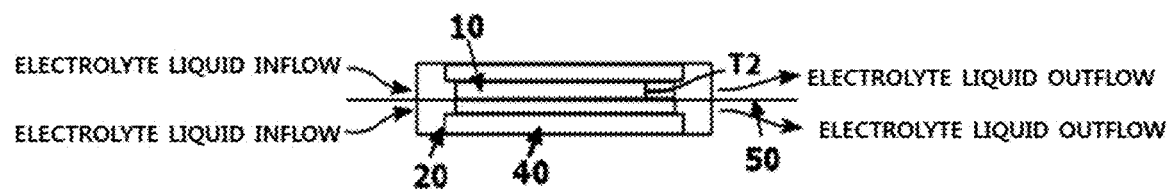

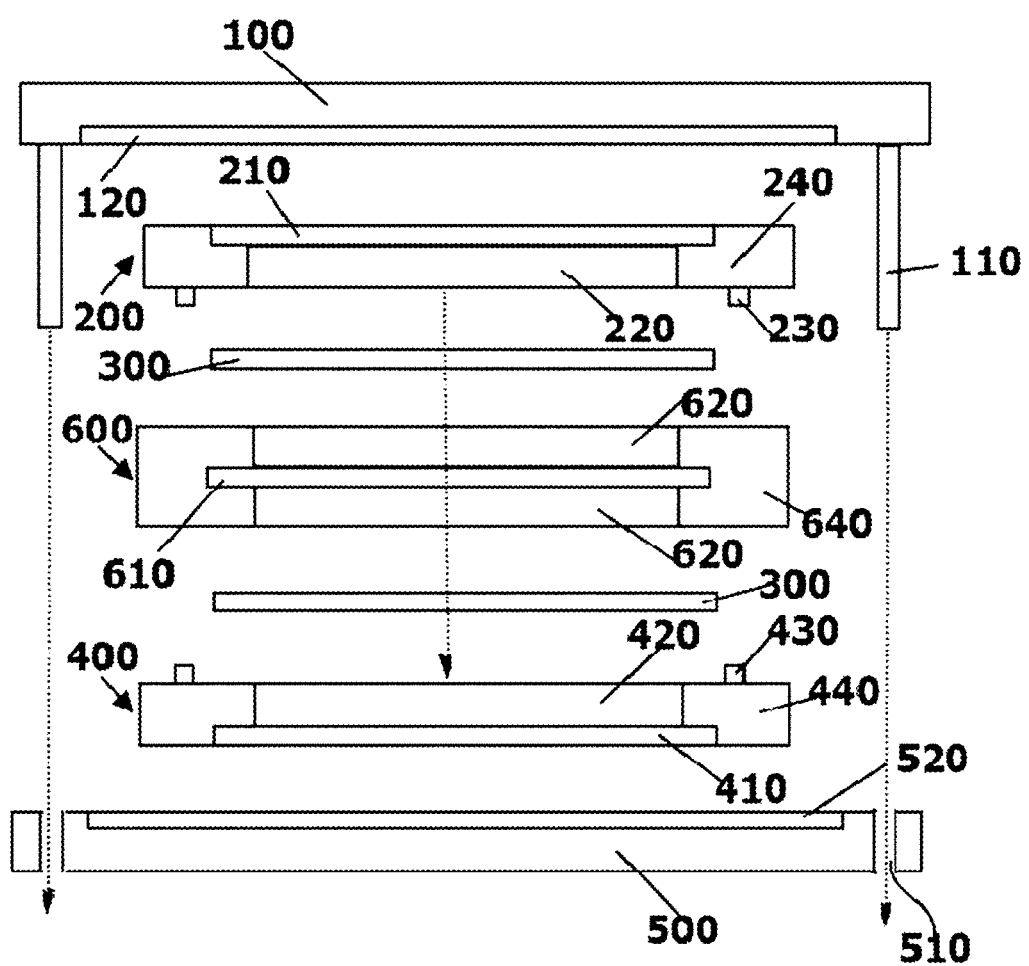
[FIG. 6]

[FIG. 7]
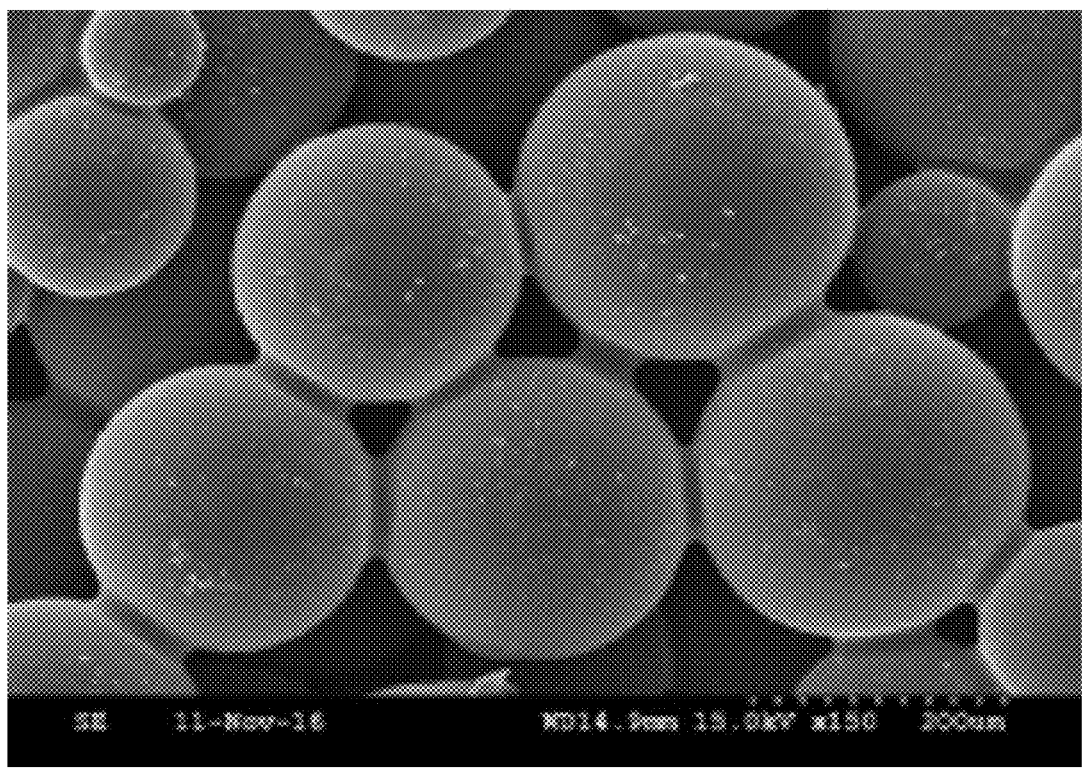

ELECTRODE STRUCTURE AND REDOX FLOW BATTERY COMPRISING SAME

TECHNICAL FIELD

The present specification is a National Stage Application of International Application No. PCT/KR2018/002335 filed on Feb. 26, 2018, which claims priority to and the benefits of Korean Patent Application No. 10-2017-0026394, filed with the Korean Intellectual Property Office on Feb. 28, 2017, the entire contents of which are incorporated herein by reference.

The present specification relates to an electrode structure, and a redox flow battery comprising the same.

BACKGROUND ART

Power storage technology is an important technology for efficient use across the whole energy such as efficiency of power usage, enhancing capability or reliability of a power supply system, expansion of introduction of new and renewable energy with large variation over time, or energy recovery of a moving body, and its development potential and demands for social contribution have been increasing.

Studies on secondary batteries have been actively progressed in order to adjust a supply-demand balance of semi-autonomous regional power supply systems such as microgrids and properly distribute an uneven output of new and renewable energy generation such as wind or sunlight generation, and to control effects of voltages and frequency fluctuations occurring from differences with existing power systems, and expectations for secondary battery utilization in such fields are increasing.

When examining properties required for secondary batteries to be used for large capacity power storage, energy storage density needs to be high, and as a high capacity and high efficiency secondary battery most suited for such properties, a flow battery has received most attention.

A flow battery is formed so that cathode and anode electrodes are located on both sides with a separator as a center.

Outside the electrodes, plates for battery fastening and electric conduction are each provided, and the constitution comprises a cathode tank and an anode tank containing an electrolyte, and an inlet through which the electrolyte enters and an outlet through which the electrolyte comes out again.

DISCLOSURE

Technical Problem

The present specification is directed to providing an electrode structure, and a redox flow battery comprising the same.

Technical Solution

One embodiment of the present specification provides an electrode structure comprising a carbon block having pores; and a flow frame having the carbon block accommodated on one surface or both surfaces, wherein the carbon block has porosity of greater than or equal to 5% and less than or equal to 70%, and the carbon block has compressive strength of 20 MPa or greater.

Another embodiment of the present specification provides a redox flow battery comprising a first end plate; a first monopolar plate; a separator; a second monopolar plate; and a second end plate, wherein the first end plate, the first monopolar plate, the separator, the second monopolar plate, and the second end plate are provided in consecutive order, wherein at least one of the first and the second monopolar plates is the electrode structure described above.

Advantageous Effects

An electrode of an electrode structure according to the present specification has advantages of being hardly compressed by a fastening pressure of a battery cell, and maintaining porosity when manufactured.

A redox flow battery according to the present specification has an advantage of supplying an electrolyte liquid to an electrode in a high flow rate.

DESCRIPTION OF DRAWINGS

FIG. 1 is an exploded sectional view of fastening a battery using an electrode structure according to an existing technology.

FIG. 2 is a sectional view of a battery fastened using an electrode structure according to an existing technology.

FIG. 3 is a sectional view of an electrode structure of an embodiment according to the present specification.

FIG. 4 is an exploded sectional view of fastening a battery using an electrode structure of one embodiment according to the present specification.

FIG. 5 is a sectional view of a battery fastened using an electrode structure of one embodiment according to the present specification.

FIG. 6 is an exploded sectional view of a redox flow battery using an electrode structure of another embodiment according to the present specification.

FIG. 7 is an image observing a carbon block according to the present specification at a magnification of 150 using a scanning electron microscope.

MODE FOR DISCLOSURE

Hereinafter, the present specification will be described in detail.

An electrode structure of the present specification comprises a carbon block having pores; and a flow frame having the carbon block accommodated on one surface or both surfaces.

When the electrode structure comprises a carbon block; and a flow frame having the carbon block accommodated on one surface, the electrode structure is a monopolar plate. Herein, the monopolar plate means a plate in which only one surface provided with the carbon block performs a role of an electrode.

When the electrode structure comprises a carbon block; and a flow frame having the carbon block accommodated on both surfaces, the electrode structure is a bipolar plate. Herein, the bipolar plate means a plate in which both surfaces provided with the carbon block all perform a role of an electrode. Electrodes on the both surfaces of the bipolar plate are either electrodes opposite to each other or the same electrodes, and specifically, when the electrode on one surface is an anode, the electrode on the other surface may perform a role of a cathode.

The carbon block may have porosity of greater than or equal to 5% and less than or equal to 70%, specifically greater than or equal to 20% and less than or equal to 50%, and more specifically greater than or equal to 30% and less than or equal to 40%.

When fastening a flow battery, changes in the carbon block may be 10% or less, specifically 2% or less, and more specifically, the carbon block may hardly change. In this case, the carbon block hardly shrinks when fastening a flow battery cell using the carbon block, and porosity of the carbon block may be maintained when manufactured even in the fastened battery cell. Herein, the change in the porosity means a difference between porosity before applying a pressure and porosity after applying a pressure.

An average thickness of the carbon block may be selected considering a depth of the carbon block accommodating groove and the fastening structure, and specifically, an average thickness of the carbon block may be the same as an average depth of the carbon block accommodating groove, or may be smaller or larger than an average depth of the carbon block accommodating groove. For example, when the accommodating groove has a depth of 2 mm, the carbon block thickness is generally 2 mm, however, depending on the gasket shape and thickness, the carbon block thickness may be larger or smaller than the accommodating groove depth. Specifically, when a gasket sheet is used in the whole non-conducting region of the flow frame, an effect of deepening the carbon block accommodating groove depth as the thickness of the used gasket is obtained, however, as another example, when, instead of the surface gasket type, using an o-ring- or cord o-ring-type gasket by inserting to an engrave patterned groove, an increase in the accommodating groove depth may not be obtained.

The carbon block may be prepared to be porous by filling a block-type mold with a composition comprising a spherical phenol resin and a binder, compressing and then carbonizing the result.

The carbon block may be prepared to be porous by preparing a spherical phenol resin, filling a block-type mold with a composition comprising the spherical phenol resin and liquid polyphenol, compressing the result, and then going through drying/degreasing/sintering/high purification processes.

Herein, the spherical phenol resin is a polymer, and the phenol resin means a thermocurable resin comprising resins obtained from phenols (phenol, cresol, xylenol, resorcinol) and aldehydes (formaldehyde, acetaldehyde, furfural), and modified resins thereof.

The liquid polyphenol is a relatively low molecular material, is a liquid at room temperature, and may perform a role as a binder resin linking the spherical phenol resin.

Herein, particles of the used spherical phenol resin may be spherical polyresin particles having an average diameter of 100 μm to 800 μm.

The carbon block has compressive strength of 20 MPa or greater, and specifically, 25 MPa or greater. In this case, the carbon block hardly shrinks when fastening a flow battery cell using the carbon block, and porosity of the carbon block may be maintained when manufactured even in the fastened battery cell. Herein, the higher the compressive strength, the better, and therefore, the upper limit is not specified. Herein, the compressive strength means a value measured using a test analysis method specified in the KS L 1601:2006.

The carbon block has sintered density of 0.6 g/cm$^3$ or greater, and specifically 0.7 g/cm$^3$ or greater. In this case, the carbon block hardly shrinks when fastening a flow battery cell using the carbon block, and porosity of the carbon block may be maintained when manufactured even in the fastened battery cell. Herein, the higher the sintered density, the better, and therefore, the upper limit is not specified. Herein, the sintered density means a value measured using a test analysis method specified in the KS L 3409:2010.

The carbon block may have an average pore size of greater than or equal to 25 μm and less than or equal to 200 μm, specifically greater than or equal to 70 μm and less than or equal to 120 μm, and more specifically greater than or equal to 90 μm and less than or equal to 110 μm.

The carbon block may additionally go through heat treatment before battery fastening. Specifically, the carbon block may be heat treated for a certain period of time or longer at a high temperature while supplying air. Herein, the heat treatment temperature may be around 500° C., and the heat treatment time may be longer than or equal to 5 hours and shorter than or equal to 7 hours.

On at least one surface of the carbon block, an interfacial resistance reducing layer comprising any one selected from among carbon paper, carbon cloth and thin carbon felt may be further included and provided. Specifically, the electrode structure may further comprise carbon paper provided on one surface or both surfaces of the carbon block. This may lower interfacial resistance and enhance a reaction rate.

The interfacial resistance reducing layer may have a thickness of greater than or equal to 0.01 mm and less than or equal to 1 mm, and greater than or equal to 0.1 mm and less than or equal to 0.7 mm. This may lower interfacial resistance and enhance a reaction rate.

When providing the interfacial resistance reducing layer on at least one surface of the carbon block, an average thickness of the carbon block may be selected considering the thickness of the interfacial resistance reducing layer. Specifically, the carbon block provided with the interfacial resistance reducing layer on at least one surface may have an average thickness sum of the carbon block and interfacial resistance reducing layer being the same as an average depth of the carbon block accommodating groove, or smaller or larger than an average depth of the carbon block accommodating groove. For example, when the carbon block accommodating groove has an average depth of 2 mm, the carbon block may have an average thickness of 2 mm, and the interfacial resistance reducing layer may have a thickness of 0.5 mm.

Carbon paper means a material such as a thin paper prepared by coating a carbon material such as carbon black, carbon fiber or carbon nanotubes with a binder resin, and then heating the result.

Herein, the carbon cloth and the carbon felt are prepared with carbon fiber. Carbon fiber is a fibrous carbon material having a carbon content of 90% or greater in a weight ratio. The strength is approximately 10 times that of steel, and is a light weight material with the weight being just 25%. The carbon fiber has high thermal conductivity and low coefficient of thermal expansion, excellent electrical conductivity and chemical resistance in addition to excellent mechanical properties.

The carbon cloth (carbon sheet) is woven with carbon fiber (woven fabric), and the carbon felt is made by, like a non-woven fabric, adhering carbon fiber by thermal adhering or using chemical agents, or tangling with a needle and the like, that is, is a felt type prepared without weaving carbon fiber (non-woven fabric).

Based on FIG. 1 and FIG. 2, when using carbon felt (1) instead of the carbon block of the present specification, and inserting the carbon felt having a thickness of t1 before unit battery fastening to a carbon felt accommodating groove (4) having a depth of h1 and fastening the unit battery, the thickness of the carbon felt changes to t2. Herein, compressibility of the carbon felt is calculated as $\{(t1-t2) \times 100\}/t1$. As the carbon felt compressibility increases, an effect of reducing interfacial resistance between materials is obtained, however, electrolyte liquid flowability may worsen since porosity of the carbon felt decreases.

For example, when carbon felt having a thickness of 5 mm is inserted to a felt accommodating groove of a flow frame and the accommodating groove has a depth of 3 mm, the carbon felt may be considered to have compressibility of 40%.

However, by the electrode structure of the present specification being provided with a carbon block, changes in the thickness are small by the pressure during battery fastening, and accordingly, an advantage of favorable electrolyte liquid flowability is obtained by almost maintaining porosity and pore sizes of the carbon block while having low interfacial resistance.

Based on FIG. 4 and FIG. 5, when inserting a carbon block having a thickness of T1 before unit battery fastening to a carbon block accommodating groove (30) having a depth of H1 and fastening the unit battery, T2 of the carbon block after the fastening is almost the same as T1, a thickness of the carbon block before fastening.

The flow frame has a structure capable of accommodating a carbon block on one surface or both surfaces, a flow path capable of supplying and discharging an electrolyte liquid to the carbon block, a member sealing so as to prevent leakage of the electrolyte liquid, and a current collecting structure formed therein.

The flow frame may be provided with a carbon block accommodating groove on one surface or both surfaces. To the carbon block accommodating groove, a carbon block may be inserted, or a carbon block provided with carbon paper on at least one surface may be inserted.

In the flow frame, a graphite plate capable of being in contact with the accommodated carbon block, and collecting a current by a surface opposite to the surface in contact with the carbon block adjoining a current collector may be provided so as to prevent electrolyte liquid leakage.

The flow frame may be provided with a carbon block accommodating hole perforated in a thickness direction.

When the flow frame is provided with a carbon block accommodating hole, the electrode structure further comprises a graphite plate provided on one surface of the carbon block, and the carbon block provided with the graphite plate on the one surface may be inserted to the carbon block accommodating hole of the flow frame. Herein, sealing may be carried out so as to prevent electrolyte liquid leakage between the carbon block accommodating hole of the flow frame and the graphite plate.

A redox flow battery of the present specification comprises a first end plate; a first monopolar plate; a separator; a second monopolar plate; and a second end plate in consecutive order.

At least one of the first and the second monopolar plates may be the electrode structure described above. Specifically, any one of the first and the second monopolar plates may be the electrode structure described above, or the first and the second monopolar plates may each be the electrode structure described above.

Herein, the monopolar plate means a plate in which only one surface provided with the carbon block performs a role of an electrode, and therefore, at least one of the first and the second monopolar plates may be an electrode structure comprising a flow frame accommodating a carbon block on one surface.

When the first and the second monopolar plates each comprise the electrode structure, the sum of average thicknesses of the carbon blocks each accommodated in the first and the second monopolar plates may be the same as or smaller than the sum of an average depth of the carbon block accommodating groove of each of the first and the second monopolar plates and a pressurized thickness of a sealing member when fastening the redox flow battery.

The redox flow battery may further comprise one or more bipolar plates between the first and the second monopolar plates. At least one of the one or more bipolar plates may be the electrode structure described above.

As illustrated in FIG. 6, one bipolar plate (600) may be further included between the first and the second monopolar plates (200, 400).

Herein, the bipolar plate means a plate in which both surfaces provided with the carbon block all perform a role of an electrode, and therefore, the bipolar plate comprising the above-described electrode structure may be an electrode structure comprising a carbon block; and a flow frame accommodating the carbon block on both surfaces.

The redox flow battery may further comprise a separator between the first monopolar plate and the bipolar plate and between the second monopolar plate and the bipolar plate. Specifically, as illustrated in FIG. 6, a separator (300) provided between the first monopolar plate (200) and the bipolar plate (600) and between the second monopolar plate (400) and the bipolar plate (600) may be further included.

When the redox flow battery comprises two or more bipolar plates, a separator provided between the two or more bipolar plates may be further included.

The separator is not particularly limited and may employ materials generally used in the art, and for example, may be Nafion.

The redox flow battery may further comprise a sealing member provided between the first and the second monopolar plates.

The sealing member is not particularly limited as long as it is a structure and a material capable of sealing the first and the second monopolar plates, and for example, may be a gasket line inserted to a groove formed around the carbon block accommodated in the first and the second monopolar plates, or a sealing sheet having a through hole so as not to cover the carbon block accommodated in the first and the second monopolar plates.

When fastening the redox flow battery, changes in the porosity of the carbon block may be 10% or less, and specifically 2% or less. This has an advantage in that target porosity is almost maintained even after fastening a battery, and a favorable electrolyte liquid flow is obtained.

When fastening the redox flow battery, torque generally applied to the battery cell may be greater than or equal to 50 kgf·cm and less than or equal to 300 kgf·cm, and specifically, greater than or equal to 100 kgf·cm and less than or equal to 250 kgf·cm.

A fuel cell comprising the electrode structure of the present specification is provided.

The electrode structure of the present specification may be each monopolar plate or bipolar plate provided on one surface or both surfaces of a membrane electrode assembly (MEA) in the fuel cell. Herein, the electrode structure of the present specification may replace a plate provided with a gas diffusion layer and a flow path of the membrane electrode assembly. Particularly, the electrode structure of the present disclosure may replace a plate provided with a gas diffusion layer and a flow path of the membrane electrode assembly even when a separate flow path is not formed in the carbon block.

Hereinafter, the present specification will be described in more detail with reference to examples. However, the following examples are for illustrative purposes only, and not to limit the present specification.

EXAMPLE

Example 1

GF040H (carbon paper) manufactured by JNTG having a thickness of 0.4 mm was laminated on each of both surfaces of a PC009 porous carbon block manufactured by COMEX CARBON (porosity: 35.64%, thickness: 2.3 mm, pressure: 30 kgf/cm$^2$, compressive strength: 29±2 MPa, sintering density: 0.76 g/cm$^3$ when preparing carbon block).

The carbon block having the carbon paper laminated on both surfaces was inserted to a flow frame having an accommodating groove with a size of 325 cm$^2$ and a depth of 2.5 mm provided on one surface.

Nafion212 was provided as a separator, and the result was pressurized with torque of 250 kgf·cm to fasten an end cell.

Example 2

GF040H (carbon paper) manufactured by JNTG having a thickness of 0.4 mm was laminated on each of both surfaces of a PC005 porous carbon block manufactured by COMEX CARBON (porosity: 35.62%, thickness: 2.3 mm, pressure: 50 kgf/cm$^2$, compressive strength: 29±3 MPa, sintering density: 0.75 g/cm$^3$ when preparing carbon block).

The carbon block having the carbon paper laminated on both surfaces was inserted to a flow frame having an accommodating groove with a size of 5 cm×5 cm and a depth of 2.5 mm provided on one surface.

Nafion212 was provided as a separator, and the result was pressurized with torque of 250 kgf·cm to fasten an end cell.

Example 3

An end cell was fastened in the same manner as in Example 2 except that, before fastening the end cell, the carbon block of Example 2 was heat treated for 6 hours at a high temperature (500° C.) while supplying air.

Comparative Example

An end cell was fastened in the same manner as in Example 1 except that carbon felt having a thickness of 4 mm and porosity of 90% (XF30A manufactured by TOYOBO CO., LTD.) was used instead of the carbon block having carbon paper laminated on both surfaces.

Herein, the accommodating groove has a depth of 2.5 mm, and therefore, compressibility of the end cell-fastened carbon felt was approximately 38%.

Experimental Example 1

Battery Performance Measurement

To each of the end cells manufactured in Example 1 and Comparative Example, 1 L of a commercial electrolyte liquid manufactured by OXKEM Limited was supplied to each electrode by circulation, and charge and discharge was performed under a constant current (CC) mode in a 0.8 V to 1.6 V range. Herein, the charge and discharge rates were increased by 50 mA/cm$^2$ from 50 mA/cm$^2$ to 250 mA/cm$^2$, charge and discharge was carried out 3 times for each step, and performance of the third charge and discharge cycle is shown in the following Table 1.

TABLE 1

|  | Example 1 | | | | Comparative Example | | | |
| --- | --- | --- | --- | --- | --- | --- | --- | --- |
| mA/cm$^2$ | Dch. mAh | CE % | VE % | EE % | Dch. mAh | CE % | VE % | EE % |
| 50 | 34468 | 90.4 | 91.9 | 83.1 | 33413 | 90.8 | 92.5 | 84.0 |
| 100 | 29954 | 94.6 | 84.8 | 80.2 | 28978 | 94.2 | 85.8 | 80.8 |
| 150 | 24583 | 95.9 | 78.3 | 75.1 | 23599 | 95.2 | 79.4 | 75.6 |
| 200 | 18465 | 97.2 | 72.0 | 70.0 | 17138 | 96.5 | 72.9 | 70.3 |
| 250 | 10953 | 98.3 | 65.1 | 64.0 | 9400 | 97.0 | 65.4 | 63.4 |

Dch. (discharge capacity),
CE (current efficiency),
VE (voltage efficiency),
EE (energy efficiency),
mA/cm$^2$ (current per electrode active area)

It was identified that Example 1 had somewhat low voltage efficiency due to an increase in the resistance caused by an increase in the number of interfaces, however, under a high current (high output) evaluation condition of 250 mA/cm$^2$, energy efficiency was reversed compared to Comparative Example. This means that an electrolyte liquid needs to be used in a high flow rate when current density increases.

Experimental Example 2

Electrolyte Liquid Flow Rate Measurement

Two monopolar plates and two bipolar plates using the same battery (the carbon block having carbon paper laminated on both surfaces) on both surfaces of Example 1 were stacked in 3 cells, and an increase in the flow rate was checked.

Meanwhile, two monopolar plates and two bipolar plates using the same battery (carbon felt) of on both surfaces Comparative Example were stacked in 3 cells, and an increase in the flow rate was checked.

Herein, the cell differential pressure was 0.65 bar.

Since an electrolyte liquid rate is somewhat different depending on the state of charge (SOC), the experimental values of the following Table 2 were measured while the (+) electrode electrolyte liquid was in a SOC 0 state.

TABLE 2

|  | Flow Rate (ml/min · cm$^2$) |
| --- | --- |
| Comparative Example | 0.67 |
| Example 1 | 1.05 |

The flow rate of the electrolyte liquid of Example 1 using the porous carbon block increased by 57% compared to Comparative Example.

Experimental Example 3

50 cc of an electrolyte liquid manufactured by OXKEM Limited was used in each of the cathode and the anode in the end cells manufactured in Examples 2 and 3, a flow rate was supplied at a rate of 1 ml/min per unit area, charge and discharge current density was 200 mA/cm$^2$, and a continuous evaluation was progressed in a constant current mode under a 0.8 V to 1.7 V condition. The results are shown in the following Table 3.

TABLE 3

|  | Example 2 | | | | Example 3 | | | |
| --- | --- | --- | --- | --- | --- | --- | --- | --- |
|  | Dch. mAh | CE % | VE % | EE % | Dch. mAh | CE % | VE % | EE % |
| 10 Times | 632 | 95.9% | 59.0% | 56.6% | 1062 | 96.3% | 65.6% | 63.2% |

Example 3 using the heat treated carbon block was identified to have significantly enhanced performance compared to Example 2. The performance enhancement was identified to be from, through the high temperature heat treatment, providing hydrophilicity to the material and forming oxygen functional groups.

Experimental Example 4

Compression Experiment

The carbon blocks of Examples 1 to 3 each had compressive strength of 29±2 MPa and 29±2 MPa, and it was identified that, even when applying more pressure, the shape was maintained, and when applying a pressure of certain level or higher, the carbon block was broken rather than compressed while the thickness changed.

Meanwhile, the thickness of the carbon felt readily changed even when applying a pressure by hand, and it was seen that, when applying each pressure on the carbon felt specimen having a thickness of 3.53 mm and an area of 3 cm$^2$ as in the following Table 4, the thickness decreased.

TABLE 4

| Pressure | Change in Carbon Felt Thickness |
| --- | --- |
| 1 Kgf | Reduced by 1.65 mm |
| 5 kgf | Reduced by 2.75 mm |
| 15 kgf | Reduced by 3.0 mm |

REFERENCE NUMERAL

1: Carbon Felt
2: Flow frame
3: Graphite Plate
4: Carbon Felt Accommodating Groove
5: Separator
10: Carbon Block
20: Flow Frame
30: Carbon Block Accommodating Groove
40: Graphite Plate
50: Separator
60: Carbon Paper
100: First End Plate
110: Fastening Protrusion
120: Current Collector
200: First Monopolar Plate
210: Graphite Plate
220: Carbon Block
230: Sealing Member
240: Flow frame
300: Separator
400: Second Monopolar Plate
410: Graphite Plate
420: Carbon Block
430: Sealing Member
440: Flow frame
500: Second End Plate
510: Fastening Hole
520: Current Collector
600: Bipolar Plate
610: Graphite Plate
620: Carbon Block
640: Flow frame

The invention claimed is:

1. An electrode structure comprising:
a carbon block having pores; and
a flow frame having the carbon block accommodated on one surface or both surfaces,
wherein the carbon block has porosity of greater than or equal to 5% and less than or equal to 70%, and the carbon block has compressive strength of 20 MPa or greater, and
wherein the carbon block has sintered density of 0.6 g/cm$^3$ or greater.

2. The electrode structure of claim 1, wherein the flow frame is provided with a carbon block accommodating groove accommodating the carbon blocks, and
wherein a thickness of the carbon block is smaller than a depth of the carbon block accommodating groove.

3. The electrode structure of claim 1, further comprising an interfacial resistance reducing layer comprising any one selected from among carbon paper, carbon cloth and thin carbon felt provided on at least one surface of the carbon block.

4. The electrode structure of claim 1, wherein the flow frame is provided with a carbon block accommodating hole perforated in a thickness direction.

5. The electrode structure of claim 4, further comprising a graphite plate provided on one surface of the carbon block,
wherein the carbon block provided with the graphite plate on the one surface is inserted to the carbon block accommodating hole of the flow frame.

6. A redox flow battery comprising:
a first end plate;
a first monopolar plate;
a first battery separator;
a second battery separator;
a second monopolar plate; and
a second end plate, wherein the first end plate, the first monopolar plate, the separator, the second monopolar plate, and the second end plate are provided in consecutive order, wherein at least one of the first and the second monopolar plates is the electrode structure of claim 1.

7. The redox flow battery of claim 6, further comprising one or more bipolar plates between the first battery separator and the second battery separator, wherein at least one of the one or more bipolar plates is the electrode structure.

8. The electrode structure of claim 1, wherein the carbon block is comprised of a phenol resin.

9. A redox flow battery comprising:
a first end plate;
a first monopolar plate;
a first separator;
a second separator;
one or more bipolar plates between the first separator and the second separator;
a second monopolar plate; and
a second end plate,
wherein each of the bipolar plates is an electrode structure comprising:
a carbon block having pores; and
a flow frame having the carbon block accommodated on one surface or both surfaces,
wherein the carbon block has porosity of greater than or equal to 5% and less than or equal to 70%, and the carbon block has compressive strength of 20 MPa or greater, and wherein the carbon block has sintered density of 0.6 g/cm$^3$ or greater.

10. The redox flow battery of claim 9, wherein the flow frame is provided with a carbon block accommodating groove accommodating the carbon blocks, and wherein a thickness of the carbon block is smaller than a depth of the carbon block accommodating groove.

11. The redox flow battery of claim 9, further comprising an interfacial resistance reducing layer comprising any one selected from among carbon paper, carbon cloth and thin carbon felt provided on at least one surface of the carbon block.

12. The redox flow battery of claim 9, wherein the flow frame is provided with a carbon block accommodating hole perforated in a thickness direction.

13. The redox flow battery of claim 12, further comprising a graphite plate provided on one surface of the carbon block, wherein the carbon block provided with the graphite plate on the one surface is inserted to the carbon block accommodating hole of the flow frame.

14. The redox flow battery of claim 9, wherein the first end plate includes a protrusion extending from a first surface of the first end plate facing the second end plate, wherein the second end plate includes a protrusion, and wherein the protrusion of the second end plate accommodates the protrusion of the first end plate.

15. The redox flow battery of claim 9, wherein the carbon block is comprised of a phenol resin.

* * * * *